Feb. 25, 1964   L. V. CARRIER   3,122,382
FORE AND AFT ROCKING AND LATERALLY SHIFTING
FITH WHEEL SUSPENSION
Filed July 5, 1961

INVENTOR.
LOUIS V. CARRIER

BY *Price & Heneveld*

ATTORNEYS

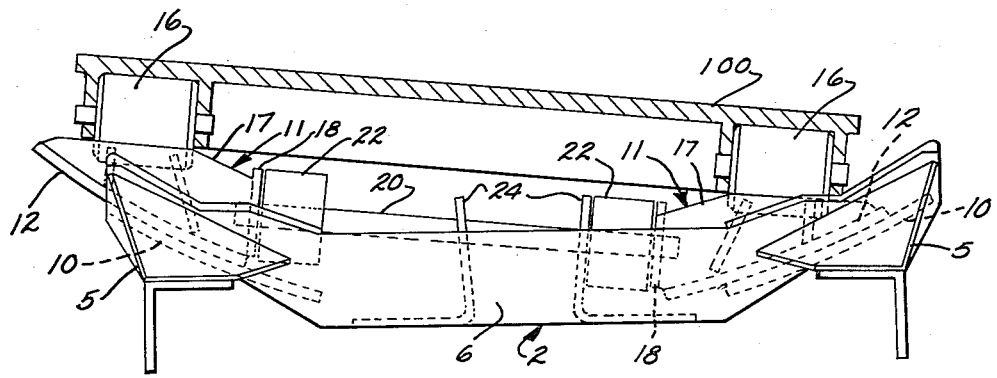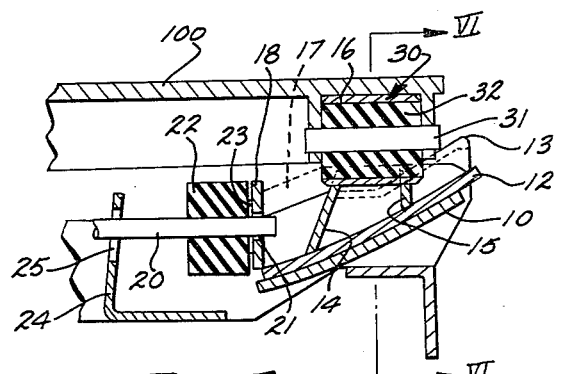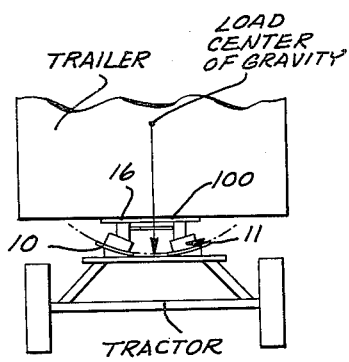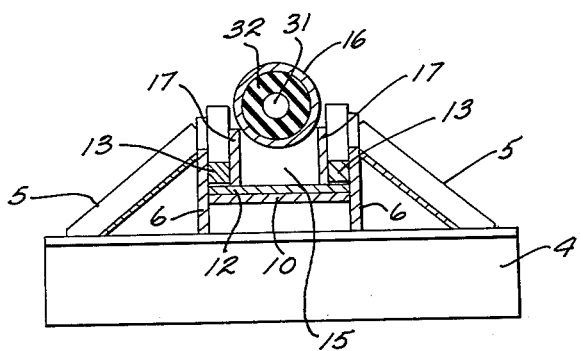

3,122,382
FORE AND AFT ROCKING AND LATERALLY
SHIFTING FIFTH WHEEL SUSPENSION
Louis V. Carrier, Milpitas, Calif., assignor to Holland
Hitch Company, Holland, Mich., a corporation of
Michigan
Filed July 5, 1961, Ser. No. 121,995
6 Claims. (Cl. 280—438)

This invention relates to a fifth wheel mounted upon a truck or tractor frame for supporting and carrying a trailer. More particularly, it relates to the oscillating type of fifth wheel which permits the truck-trailer combination to traverse road or other surface irregularities without torsional strain being transmitted from the truck to the trailer or vice versa, and which stabilizes the combination by compensating means.

Presently there are two popular types of fifth wheels, the oscillating type and what will be referred to herein as the rigid trunnion pin type. In the conventional oscillating type wheel the plate rocks fore and aft and also tilts transversely through an included angle of 10°–15°, supplying a full universal action that takes a substantial part of the twist out of the trailer. This type of wheel, however, is recommended only for tank and low bed trailers and should never be used with van trailers or those with a high center of gravity.

The rigid trunnion pin type wheel has its plate mounted for rocking movement, fore and aft, on a single shaft or a pair of pins mounted each on a saddle type bracket. In other words, in the rigid trunnion pin type wheel the plate is held rigidly against any type of pivotal or shifting movement in a lateral direction.

This invention provides an entirely novel means of effectively attaching the fifth wheel to the tractor frame; such means securing the fifth wheel plate against forward or backward sliding movement but allowing it to pivot fore and aft, and shift or slide sidewise, in response to the torsional strains created by road or other irregularities encountered.

As previously stated the oscillating type wheel is not suitable for use with trailers of high center of gravity such as van trailers because the universal joint does not furnish sufficient stability against tipping or tilting. Therefore, the rigid trunnion type wheel is used in such situations. However, with the conventional trunnion type fifth wheel, when a tractor-trailer combination passes over a surface which significantly raises the rear wheels of the tractor on one side higher than those on the other, the frame of the tractor is inclined laterally. Since the fifth wheel is rigidly secured to this frame so far as lateral position is concerned, the forward end of the trailer is forced to move with the tractor frame, thus twisting the trailer between its rear wheels and the fifth wheel mount. This maneuver racks the trailer severely as well as applying excessive loads to the fifth wheel and tractor and trailer frames. It also inclines the trailer in the same direction as the frame of the tractor is inclined, thus shifting the effective center of gravity of the trailer and its load in this direction. Also in this rigid trunnion type of wheel when only the trailer negotiates a surface which raises or lowers one side more than the other, the tipping or tilting of the trailer resulting therefrom is transmitted to the tractor. In both instances the combined action of the tilting and the shift in the effective center of gravity, greatly increases the tendency of the tractor-trailer combination to "roll over."

This invention reduces the danger of "roll over" inherent in rigid trunnion pin type wheels by transferring a portion of the effective gravitational force of the load in an opposite direction from the tilt of the trailer to compensate for the load being tilted. For example, when only the trailer tilts the fifth wheel shifts transversely in the opposite direction causing the front end of the trailer to move in that direction thus transferring the effective gravitational force of the load in that direction which counterbalances the weight of the overhang occasioned by the tilt.

This invention also reduces the danger of roll over by substantially maintaining the upright position of the trailer when only the tractor tips. This result is obtained by the front of the trailer mounted on the fifth wheel maintaining its original position as the fifth wheel component attached to the tractor moves sidewise away from the tilt and upwardly with respect to the trailer. The trailer can maintain its stable position by virtue of this sliding transverse movement between the fifth wheel components.

This invention also minimizes swaying of the top of a trailer sometimes encountered with oscillating type wheels because the arcuate bearing structures, although permitting transverse movement, provides a solid base for such movement rather than a one line pivotal connection.

Not only does this invention greatly increase the stability of the entire rig, it also reduces the severe torsional twisting that is applied to both the truck frame and the trailer frame. This greatly increases the life of both of these structures.

This invention accomplishes this result by departing significantly from the principle of the conventional oscillating fifth wheels. The conventional fore and aft fifth wheel pivot structure is retained but the transverse tilting structure is replaced by an arcuate bearing arrangement which permits a transverse sliding shift of the fifth wheel plate with relation to the truck frame. The swinging motion of the arcuate bearing is on a radius, the center of which is located between the top and bottom of the load and preferably as close as possible to the center of gravity of the load.

The invention provides a means of controlling the up and down or vertical movement and the sideways movement of the fifth wheel so that these movements are simultaneous and proportional one to the other.

The invention provides a means of shifting weight away from the direction of tilt of either the truck or the trailer, thus reducing the gravitational forces acting to roll over the truck and trailer. In so doing, the shifted weight compensates for the overhang of the trailer and the increase in weight on one side of the tractor-trailer combination caused by the tilting thus in effect maintaining the effective center of gravity relatively constant with respect to the wheels. In other words the arcuate movement of the fifth wheel plate is substantially on an arc the point of generation which is at the center of gravity of the load. This maintains the center of gravity of the load vertically aligned with the center line of the wheels reducing any unbalance of gravitational forces on either side of the wheels center line.

This invention provides a constant four-point support for the trailer. The invention compensates for the centrifugal forces generated in negotiating changes of direction at speeds dangerous to the conventional oscillating and rigid trunnion pin type wheels.

The invention reduces the racking and twisting of both the truck and trailer frames, thereby increasing their life and reducing maintenance.

These and other objects and purposes of this invention will be immediately understood by those acquainted with the design and construction of tractor-trailer equipment upon reading the following specification and the drawings.

In the drawings:

FIG. 4 is a rear elevational view of the mounting structure for the fifth wheel plate showing the structure shifted to one side (the fifth wheel plate being shown in section);

FIG. 5 is a fragmentary, sectional elevational view taken along the plane V—V of FIG. 3;

FIG. 6 is a sectional, elevational view taken along the plane VI—VI of FIG. 5;

FIG. 7 is a schematic of a tractor-trailer combination with the novel fifth wheel of this invention and showing their inter-relationship.

Figure 1:
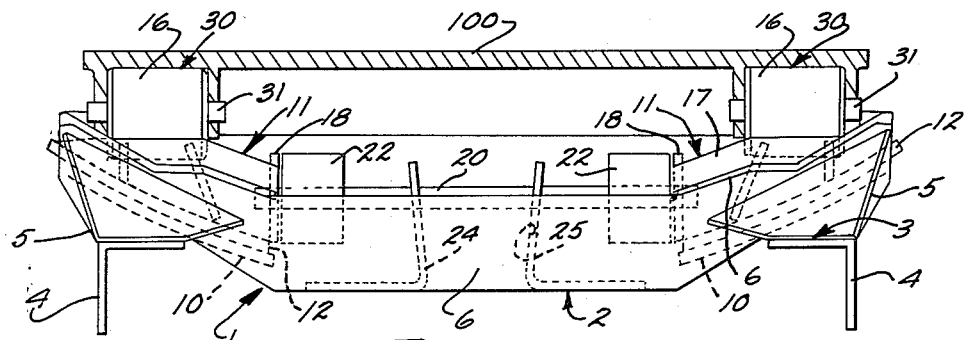
FIG. 1 is a rear elevational view of this invention showing the fifth wheel plate in section.
Figure 2:
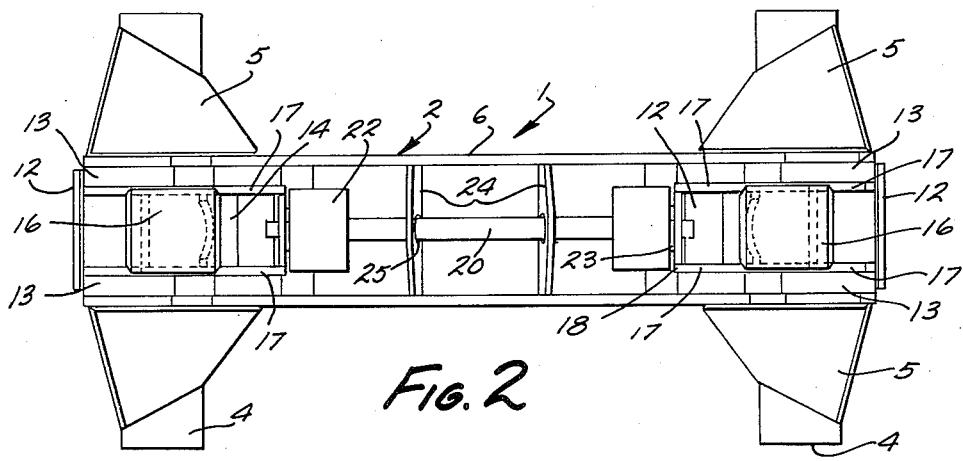
FIG. 2 is a plan view of this invention with the fifth wheel plate omitted.
Figure 3:
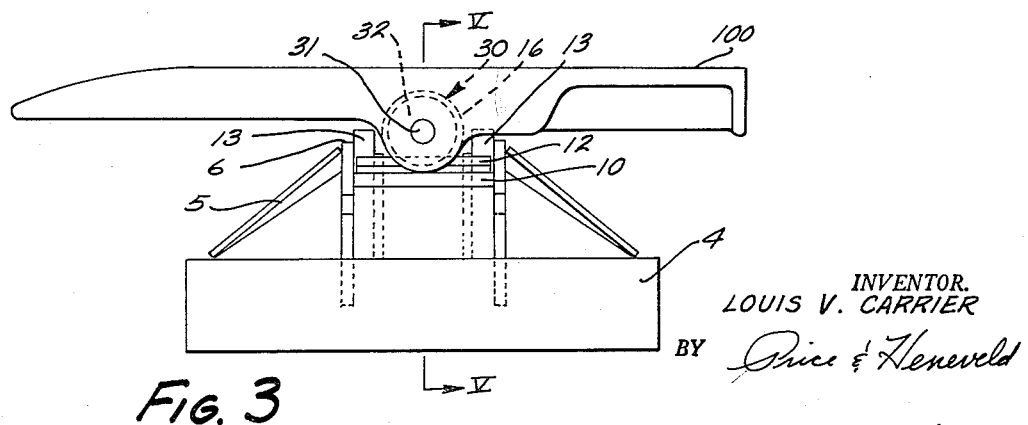
FIG. 3 is a side elevational view of the structure shown in FIG. 1.

In executing the objects and purposes of this invention, there is provided a conventional fifth wheel plate which is conventionally mounted on trunnions for fore and aft pivotal movement. These trunnions are mounted on curved bearing shoes which in turn ride on curved bearing plates. The latter, in effect, constitutes a track. Sliding movement is permitted between the shoe and the plate sideways of the fifth wheel plate. The plates and shoes are curved to be segments of an arc formed by a radius which has its point of generation between the top and bottom of the load and preferably above the center of load within the trailer. The track is concave, curving upwardly toward both of its ends. Sideways movement of the trunnions and their supporting bearing shoes is limited by resilient shock absorbers. The relative sliding movement between the bearing shoes and the bearing permits the fifth wheel plate and, thus, the front of the trailer to shift to either side of the truck frame. However, as it does so, the trailer and the fifth wheel plate must rise with relation to the truck frame and, thus, this shifting will not occur unless substantial lateral or sideways forces are applied to the invention. In fact, this lateral or sideways force must be great enough to overcome the centering effect created by the weight of the trailer and its load.

Referring specifically to the drawings, the numeral 1 refers to a carriage for a fifth wheel plate 100. The carriage 1 has a mounting bracket assembly or stationary frame 2. The ends of the stationary frame 2 are turned upwardly forming seats 3 where the stationary frame rests on the mounting flanges 4. The mounting flanges 4 are secured to the stationary frame 2 by suitable means such as welding and are further anchored by the flaring side braces 5.

The main frame 2 consists of a pair of vertical plates 6 which are spaced apart lengthwise of the mounting flanges 4. At each end of the stationary frame 2 above the mounting flanges 4, an arcuate bearing floor plate 10 extends between the side flanges 6. The bearing plates 10 are curved lengthwise of the stationary frame 2 and their upper surfaces are concave. Their upper surfaces constitute segments of a circular path. This path has a radius which is greater than the spacing between the ends of the stationary frame 2. This radius is of such size that its point of genaration is between the floor and the roof of the trailer to be secured by the fifth wheel. Preferably, this point of generation is located close to the center of gravity of the loaded trailer immediately above the fifth wheel (see FIG. 7). The curved upper surfaces of the bearing plates 10 are part of a single path which, when projected across the full width of the stationary frame 2, forms a shallow concavity within the main frame.

Seated on each of the bearing plates 10 is a cradle 11. Each of the cradles 11 has an arcuate bearing shoe 12 which slidably seats upon one of the bearing plates 10. The bearing shoes 12 have a width such that they fit closely between but are freely slidable with respect to the side plates 6 of the stationary frame 2 (FIG. 6). They are held against vertical displacement from the bearing plates 10 by hold down bars or guides 13. The hold down bars or guides 13 may be either fixedly or detachably secured to the side plates 6 and provide a sliding clearance with the bearing shoes 12.

Secured to the top surface of each of the bearing shoes 12 and having side clearance with the hold down bars 13 are a pair of bearing end plates 14 and 15 (FIG. 5). These by their upper ends rigidly support the bearing tubes 16. One bearing tube 16 is provided for each of the cradles 11. The bearing plates 14 and 15 are welded to both the bearing shoe 12 and the bearing tube 16 so that the bearing tube 16 is rigidly secured.

Each of the cradles also has a pair of bearing risers 17 which fit inside the hold down bars 13 with sufficient clearance between them and the hold down bars 13 that there is no binding contact (FIG. 6). The lower edges of the bearing risers 17 are welded to the upper surface of the bearing shoes 12. The side edges of the bearing end plates 14 and 15 are welded to the inside surfaces of the bearing risers to strengthen the assembly.

At the inner end of each of the cradles the ends of the bearing risers 17 are joined by a rod plate 18 (FIG. 5). The rod plates 18 are vertical and their purpose will be described subsequently.

The cradles 11 are joined by a space control rod 20. Both ends of the space control or tie rod 20 are of slightly reduced diameter and pass through clearance openings 21 in the rod plates 18. Surrounding the rod 20, adjacent each of the rod plates 18, is a large, rubber shock absorber or snubber 22. The rubber shock absorbers 22 are mounted on the rod 20 adjacent each of its ends and each shock absorber is spaced from the adjacent rod plate by a spacer 23.

Securely affixed to the side plates 6, a short distance on each side of the midpoint between the cradles 11, is a shock absorber stop plate 24. The space control rod 20 passes through both of these plates and is provided with a clearance opening 25 which permits the space control rod to maneuver freely as the cradles 11 shift position without binding with the shock absorber stop plates 24.

Seated on the bearing tubes 16 and extending between the bearing tubes 16 is the fifth wheel plate 100. The fifth wheel plate 100 has two bearing recesses 30 to receive the upper portions of the bearing tubes 16. The fifth wheel plate is secured to each bearing tube by a pin 31 which is seated in the center of a rubber cushion 32 which is fitted within the bearing tube 16. The fifth wheel plate 100, the bearing tube 16, the pin 31, and the rubber cushion 32 are all conventional and well-known in the art of fifth wheel construction. Therefore, further detailed description of them will not be provided.

The stationary frame 100 is secured to the frame of a truck-tractor over the rear wheels of the truck-tractor. As so secured, it extends crosswise of the truck-tractor frame and the attachment is made by means of the mounting flanges 4.

The attachment of the fifth wheel plate 100 to the cradles 11 by means of the conventional bearing tube 16, pin 31, and rubber cushion 32 permits the fifth wheel plate to rock or pivot about an axis extending crosswise of the truck frame and parallel to the mounting bracket assembly 1. This rocking or pivotal motion of the fifth wheel plate 100 is conventional. However, when the truck-tractor passes over an irregular surface, such that the rear wheels on one side are raised higher than the rear wheels on the other side, in the conventional rigid trunnion type fifth wheel mount the twisting motion of the truck frame is transmitted directly to the trailer and the front end of the trailer is forced to twist with the truck frame. However, by application of this invention, when this occurs there will be relative sideways displacement of the cradles 11 with respect to the stationary frame 2. FIG. 4 illustrates this situation. Thus, as the truck frame twists, that is, is raised on one side, the stationary frame 2 moves with the truck frame. However, the fifth wheel plate 100 being secured firmly to the trailer and to the cradles 11 will tend to stay in its original position while the stationary frame moves sideways with respect to the cradles. This occurs because of relative sliding displacement between the bearing plates 10 and the bearing shoes 12.

If the sideways tilting of the truck frame is severe, this displacement movement between the cradles and the stationary frame 2 will continue until it is stopped by one of the rubber shock absorbers 22 being brought into bearing against the adjacent shock absorber stop plate 24. This condition is illustrated in FIG. 4. Thus, the amount of lateral displacement is accurately controlled. The same thing occurs when the truck negotiates a change in direction at high velocity. However, in this case the procedure is reversed. When this occurs, the truck frame remains horizontal but the trailer due to centrifugal force shifts sideways with respect to the truck frame. Since the bottom of the trailer can thus shift, the center of gravity of the load remains substantially midway between the wheels of the truck rather than moving to the outside of the curve as the result of the trailer tilting under centrifugal forces. This results from the fact that the point of generation of the arc along which the shifting occurs is located at or close to the load center of the trailer.

When the wheels of the truck-tractor are raised on one side as by passing over an uneven surface, as has been previously explained, the lower front end of the trailer shifts away from the side of the truck-tractor which is raised. Thus, in effect, the top of the trailer is tipped toward the side of the truck-tractor which has been raised. In the conventional fifth wheel structure, the trailer is twisted to tilt away from the raised wheels. When this latter happens, the center of gravity of the loaded trailer is shifted away from the raised wheels thus increasing the forces tending to roll over the trailer. By this invention, however, gravitational force of the weight is shifted in an opposite direction from the tilt causing the center of gravity to be retained at a point centered between the wheels, greatly reducing the forces tending to cause roll over. Again, this result arises from the fact that the relative displacement between the truck and the trailer is about a point which is at or near to the center of gravity of the load. The same is true as the result of the outward shifting of the lower front end of the trailer when the trailer is negotiating a change in direction at high speed.

It will be recognized that numerous changes may be made in the particular structure that has been described. For example, the hold down or guide bars 13 may be made detachable from the side plates 6 whereby they may be replaced, adjusted, or shimmed, as desired to compensate for wear. The bearing surface between the bearing plates 10 and the bearing shoes 12 may have their friction reduced by the application of a layer of a suitable friction reducing material such as nylon to one of these surfaces. These and other changes, however, are mere modifications of the basic principles of this invention. All such modifications are to be considered as included in the hereinafter appended claims unless these claims by their language expressly state otherwise.

I claim:

1. A support for a tractor-trailer fifth wheel plate comprising: an elongated stationary frame; said frame adjacent each end having an arcuately concave bearing plate; the curvature of said bearing plates being segments of an arc traced by a radius of a length greater than the length of said stationary frame; a movable frame having a pair of cradles, one at each end; a tie rod connected to and extending between said cradles and holding said cradles at a fixed distance from each other; each of said cradles having a convex shoe slidably seated on one of said bearing plates; guide means mounted on said stationary frame and overlapping a portion of each of said shoes and restraining said shoes from lifting away from said bearing plates; stop means for limiting the sliding movement of said movable frame with respect to said stationary frame; bearing means on said movable frame, said bearing means mounting said fifth wheel plate for pivotal movement about an axis parallel to the direction of movement of said movable frame.

2. A support for a tractor-trailer fifth wheel plate comprising: an elongated stationary frame; said frame adjacent each end having an arcuately concave bearing plate; the curvature of said bearing plates being segments of an arc traced by a radius of length greater than the length of said stationary frame; a movable frame having a pair of cradles, one at each end; a tie rod connected to and extending between said cradles and holding said cradles at a fixed distance from each other; each of said cradles having a convex shoe slidably seated on one of said bearing plates; guide means mounted on said stationary frame and overlapping a portion of each of said shoes and restraining said shoes from lifting away from said bearing plates; a pair of stop plates mounted on said stationary frame each having clearance openings to permit said tie rod to move therethrough; a pair of resilient snubbers surrounding said tie rod and each abutting one of said cradles, said snubbers being movable with said cradles and tie rod into abutment with said stop plates for limiting movement of said movable frame with respect to said stationary frame; bearing means on said movable frame, said bearing means mounting said fifth wheel plate for pivotal movement about an axis parallel to the direction of movement of said movable frame.

3. A support for a tractor-trailer fifth wheel plate comprising: an elongated stationary frame; said frame adjacent each end having an arcuately concave bearing plate; the curvature of said bearing plates being segments of an arc traced by a radius of a length greater than the length of said stationary frame; a movable frame having a pair of cradles, one at each end; a tie rod connected to and extending between said cradles; each of said cradles having a convex shoe slidably seated on one of said bearing plates; resilient stop means for limiting the sliding movement of said movable frame with respect to said stationary frame; bearing means on said movable frame, said bearing means mounting said fifth wheel plate for pivotal movement about an axis parallel to the direction of movement of said movable frame.

4. A support for a tractor-trailer fifth wheel plate comprising: an elongated stationary frame; said frame adjacent each end having an arcuately concave bearing plate; the curvature of said bearing plates being segments of an arc traced by a radius of a length greater than the length of said stationary frame; a movable frame having a pair of cradles, one at each end; a tie rod connected to and extending between said cradles; each of said cradles having a convex shoe slidably seated on one of said bearing plates; resilient shock absorbing members mounted on said tie rod and stop means on the other sides of said shock absorbing members from said shoes for limiting the sliding movement of said movable frame with respect to said stationary frame; bearing means on said movable frame, said bearing means mounting said fifth wheel plate for pivotal movement about an axis parallel to the direction of movement of said movable frame.

5. A support for a tractor-trailer fifth wheel plate comprising: an elongated stationary frame; said frame adjacent each end having an arcuately concave bearing plate; the curvature of said bearing plates being segments of an arc traced by a radius of a length greater than the length of said stationary frame; a movable frame having a pair of cradles, one at each end; a tie rod connected to and extending between said cradles; each of said cradles having a convex shoe slidably seated on one of said bearing plates; stop means for limiting the sliding movement of said movable frame with respect to said stationary frame; bearing means on said movable frame, said bearing means mounting said fifth wheel plate for pivotal movement about an axis parallel to the direction of movement of said movable frame.

6. A support for a tractor-trailer fifth wheel plate comprising: a fifth wheel plate; an elongated stationary frame; said frame adjacent each end having an arcuately concave bearing plate each extending outwardly at least to the side margins of said fifth wheel plate when it is in a horizontal position; the curvature of said bearing plates being segments of an arc traced by a radius of a length greater than the length of said stationary frame; a movable frame having a pair of cradles, one at each end; a tie rod connected to and extending between said cradles; each of said cradles having a convex shoe slidably seated on one of said bearing plates; stop means for limiting the sliding movement of said movable frame with respect to said stationary frame; bearing means on said movable frame, said bearing means mounting said fifth wheel plate for pivotal movement about an axis parallel to the direction of movement of said movable frame.

References Cited in the file of this patent

UNITED STATES PATENTS

| | | |
|---|---|---|
| 2,648,544 | Kayler | Aug. 11, 1953 |
| 2,726,879 | Vaillant | Dec. 13, 1955 |
| 2,833,561 | Vaugoyeau | May 6, 1958 |
| 2,857,174 | Brown | Oct. 21, 1958 |
| 2,958,542 | Janeway | Nov. 1, 1960 |